MATERIALS TESTING CONTROL CIRCUITRY
Original Filed Oct. 5, 1965
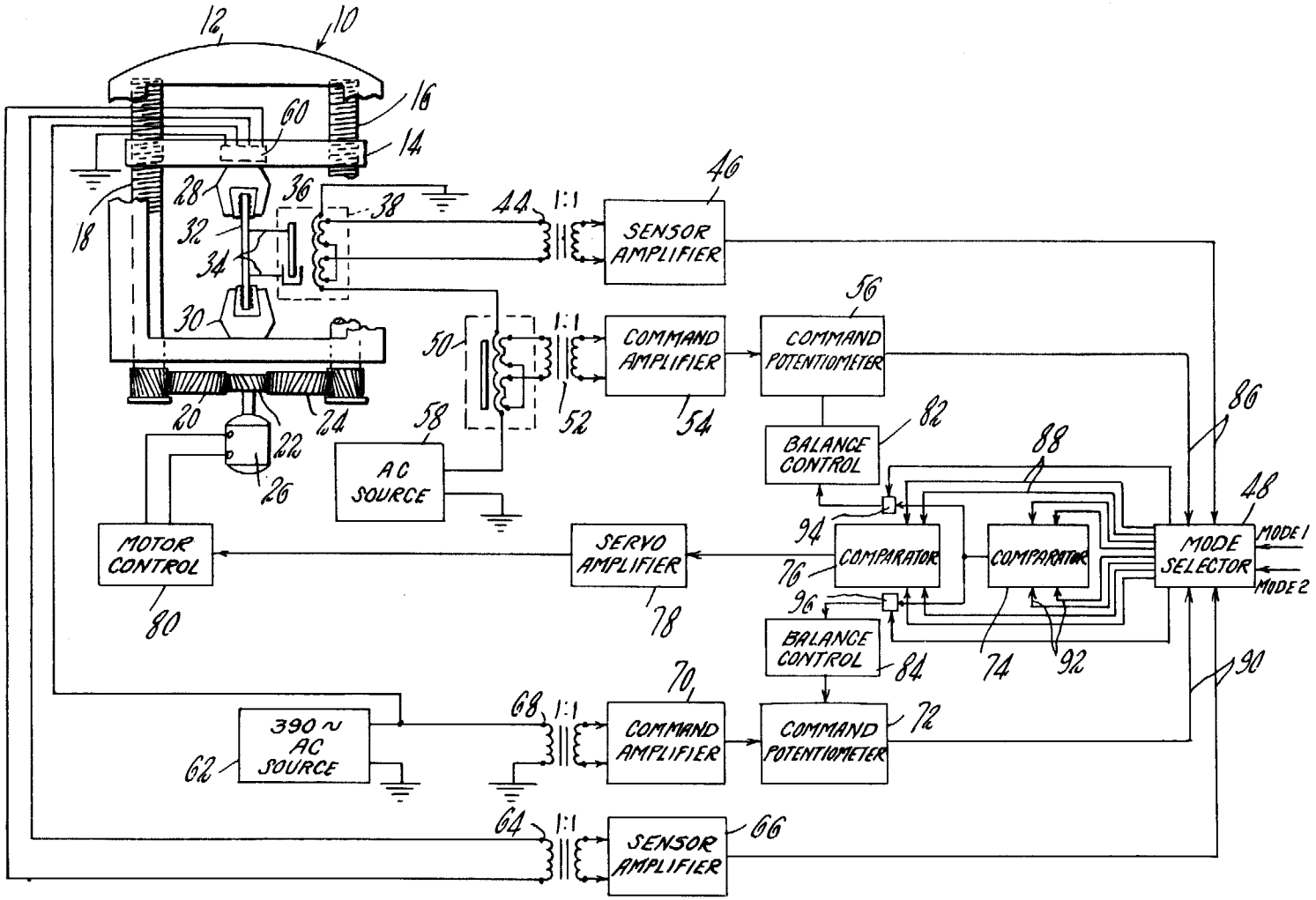

United States Patent Office

Re. 26,782
Reissued Feb. 3, 1970

26,782

MATERIALS TESTING CONTROL CIRCUITRY

John Linnartz Preston, Needham, Mass., assignor to Instron Corporation, Canton, Mass., a corporation of Massachusetts Original No. 3,374,665, dated Mar. 26, 1968, Ser. No. 493,054, Oct. 5, 1965. Application for reissue Dec. 6, 1968, Ser. No. 786,500
Int. Cl. G01n *3/00*
U.S. Cl. 73—90 4 Claims

Matter enclosed in heavy brackets [ ] appears in the original patent but forms no part of this reissue specification; matter printed in italics indicates the additions made by reissue.

ABSTRACT OF THE DISCLOSURE

Materials testing device having a movable crosshead subject to control under either of two variable commands, in which circuitry is provided to apply whichever command is in control to a motor control for the device, and simultaneously to maintain the other command commensurate with the actual condition of the specimen, so that conversion from one mode of control to another will not require sudden gross adjustment of the crosshead position.

This invention relates to the balancing of control circuits in materials testing devices.

It is a primary object of the invention to provide, in a materials testing device having a movable crosshead, for conversion from one mode of crosshead control (e.g., strain) to another (e.g., load or stress) without requiring sudden gross adjustment of the crosshead position.

The invention features a first circuit directed by a first type of command, a second circuit directed by a second type of command, and a third circuit alternately responsive to whichever of said first and second circuitry is in command to control said materials testing device and simultaneously responsive to the other of said control circuits to vary the command signal of the circuitry not in command to follow existing specimen conditions.

Other objects, features, and advantages will appear from the following description of a preferred embodiment of the invention, taken together with the attached drawing in which:

FIG. 1 is a diagrammatic view of a materials testing device including control circuits and a balance circuit.

There is shown in the drawing a portion of a materials testing device 10 comprising a frame 12, crosshead 14, drive screws 16 and 18, gears 20, 22, and 24, motor 26 and specimen grips 28 and 30.

A strain control circuit includes a sensor circuit utilizing extensometer 34 mounted on specimen 32 and mechanically coupled to linear variable differential transformer (LVDT) 38. LVDT 38 thus serves to transduce the mechanical strain in the specimen to an electrical signal which is carried by the remainder of the sensor circuit, including isolation transformer 44 and amplifier 46, to the mode selector 48. The remainder of the strain control circuit is formed by a command circuit including LVDT 50 identical to LVDT 38, isolation transformer 52, amplifier 54, and potentiometer 56 (calibrated in units of strain) arranged to present a command signal to mode selector 48, the amplitude of the command signal being controlled by the setting on potentiometer 56. The primary windings of both LVDT's are connected in series to alternating current source 58.

A load control circuit includes a sensor circuit utilizing a load cell 60, disposed in crosshead 14, energized by alternating current source 62, and providing a signal representative of the load applied to specimen 32 to the mode selector 48 through the remainder of the sensor circuit composed of isolation transformer 64 and amplifier 66. The remainder of the load control circuit is formed by a command circuit which includes isolation transformer 68, amplifier 70, and potentiometer 72 (calibrated in units of load) arranged to deliver a command signal to mode selector 48.

The strain and load control circuits under direction of mode selector 48 alternately feed comparator 76 whose output is delivered to motor 26 by means of servo amplifier 78 and motor control 80.

A balance circuit includes mode selector 48, comparator 76 fed alternately by whichever of the load and strain control circuits is in command under direction of mode selector 48, comparator 74 fed alternately by whichever of the control circuits is not in command, balance controls 82, 84 directed by mode selector 48, and normally open gates 94, 96. Balance controls 82 and 84 are arranged respectively to mechanically control the settings on potentiometers 56, 72. The potentiometer whose setting is being controlled by comparator 74 will be the one whose command is not currently controlling the materials testing device.

In operation, with mode selector 48 set on mode 1, the output of the strain control circuit on lines 86 is directed to comparator 76. The command and sensor signals on lines 88 are compared and any difference between the two causes motor control 80 to appropriately adjust the movement of crosshead 14 until the specimen strain is such as to make the sensor signal coincide with the command signal. Normally open gate 96 is closed and the load control circuit output, on lines 90, is directed to comparator 74 on lines 92 where the command and sensor signals are compared and any difference between the two causes balance circuit 84 to appropriately adjust the command on potentiometer 72 until the command signal coincides with the sensor signal. If the mode selector is set at mode 2 the load control circuit will be connected to comparator 76 for controlling the crosshead, the strain control circuit to comparator 74 for adjustment of potentiometer 56 in accordance with the specimen strain, and gate 94 will be closed.

Other embodiments will occur to those skilled in the art and are within the following claims.

What is claimed is:

1. A materials testing device comprising:

a pair of grips for applying a load to a specimen, one of said grips being attached to a movable crosshead, a motor control, a motor responsive to said motor control for moving said crosshead, a first control circuit responsive to a first variable command, a second control circuit responsive to a second variable command, and a third circuit alternately responsive to whichever of said control circuits is in command to apply the output of said circuit in command to said motor control while simultaneously responsive to the other of said control circuits to maintain the command of said other control circuit commensurate with the actual condition at the specimen.

2. The device of claim 1 wherein each of said control circuits includes a sensor circuit and a command circuit, and said third circuit includes:

first and second balance controls respectively coupled to the commands for said first and second control circuits for adjusting said commands, a first comparator responsive to said control circuits for diverting said motor control, a second comparator responsive to said control circuits for directing said balance controls, and a mode selector for alternately applying the output of whichever of said control circuits is in command to said first comparator, while simultaneously applying the output of the other of said control circuits to said second comparator, and applying the output of said second comparator to the balance control associated with said other control circuit.

3. Circuitry for controlling a materials testing device comprising:

a strain control circuit comprising:

a strain sensor circuit including a first LVDT coupled to an extensometer for mounting on said specimen and providing a signal measuring the strain in said specimen, and a strain command circuit including a second LVDT identical in electrical characteristics to said first LVDT and a first potentiometer for determining the amplitude of a signal from said strain command circuit, the primaries of said LVDT's being connected in series with a source of alternating current, a load control circuit comprising:

a load sensor circuit including a transducer in load sensing relation to said specimen and providing a signal measuring the load on said specimen, a load command circuit including a second potentiometer for determining the amplitude of a signal from said load command circuit, first and second balance controls respectively mechanically coupled to said first and second potentiometers for adjusting the settings thereon, a first comparator responsive to said control circuits for directing said motor control, a second comparator responsive to said control circuits for directing said balance controls, and a mode selector for alternately applying the output of whichever of said control circuit is in command to said first comparator, while simultaneously applying the output of the other of said control circuits to said second comparator, and applying the output of said second comparator to the balance control associated with said other control circuit to maintain the setting on the potentiometer of said other control circuit commensurate with the actual condition at the specimen.

*4. A materials testing device comprising:*

*a pair of grips for applying a load to a specimen, one of said grips being attached to a movable crosshead,*

*a motor control,*

*a motor responsive to said motor control for moving said crosshead,*

*a first control circuit responsive to a first variable command,*

*a second control circuit responsive to a second variable command, and*

*circuitry responsive to at least one of said control circuits to apply the output of said one circuit to said motor control while simultaneously responsive to the other of said control circuits to maintain the command of said other control circuit commensurate with the actual condition at the specimen.*

References Cited

The following references, cited by the Examiner, are of record in the patented file of this patent or the original patent.

UNITED STATES PATENTS

| | | | |
|---|---|---|---|
| 2,411,450 | 11/1946 | Miller et al. | 73—90 |
| 2,445,683 | 7/1948 | MacGeorge | 73—90 |
| 2,923,501 | 2/1960 | Seliger | 318—245 |
| 3,068,387 | 12/1962 | Koppel | 318—20 |
| 3,156,438 | 11/1964 | Diller et al. | 318—20 |

JERRY W. MYRACLE, Primary Examiner

U.S. Cl. X.R.

318—333